Patented June 29, 1926.

1,590,523

UNITED STATES PATENT OFFICE.

OTTO KELL, OF DES MOINES, IOWA.

PROCESS OF MAKING ARTIFICIAL MARBLE AND STONE.

No Drawing.  Application filed June 26, 1924. Serial No. 722,566.

The object of my invention is to provide a process of making artifical marble, stone, tile or the like, in which the process can be carried out conveniently and economically.

Still a further object is to provide in the process, a method of giving to the plastic material from which the marble, stone, or tile is to be formed, the desired finish so that it resembles with a great degree of accuracy, a natural slab of marble or piece of rock.

Still a further object is to provide the process of manufacturing artificial marble or stone, which will not only give a similar appearance, but will also closely resemble the smoothness and have the qualities of hardness that is found in natural marble or rock.

Still a further object is to cover or coat the plastic material with a liquid solution containing sanderac, for giving to the finished piece of marble or rock, a highly polished surface.

The process of manufacturing the artificial marble, stone or the like will now be set forth in detail.

In the commercial use of my improved process, I use Keene's cement and silica thoroughly mixed together. I have found that two parts of Keene's cement and one part of silica is the proper mixture for giving sufficient hardness to the resulting product, and at the same time, will give a finish as will closely resemble the natural product.

It may be here mentioned that marble dust may be used in place of silica.

The Keene's cement and silica, after being properly mixed together, are then mixed with a liquid solution consisting of water in which has been dissolved potassium chlorate.

The potassium chlorate and water are used in the proportions of one gallon water to one pound potassium chlorate. The potassium chlorate is dissolved in hot water and the solution should be mixed with the mixture of Keene's cement and silica, while it is yet hot.

I have found that in case a highly polished surface is desired on the resulting product, that it can be accomplished by mixing with the liquid solution, one ounce of sugar to each gallon of water and one pound of potassium chlorate.

The liquid solution is added to the cement and silica, and mixed thoroughly therewith until the entire mass comes to a consistency where it can be poured from a container.

A flat table or support with a finely polished surface is then provided and moldings are placed around the table at any desired so that the mixture, when poured will make a slab of any desired size.

I have found in actual practice that it is quite desirable to use a glass surface for the bed of the mold, and non-corroding, highly polished metal bars for the sides of the mold.

The plastic material, when poured from the supporting surface, is then leveled off by a suitable bar or roller, and before the material completely hardens, it can be cut into slabs of various sizes and shapes.

The cutting of the slab into smaller pieces can be best accomplished after the entire mass has been permitted to set for about thirty minutes.

*Veining step.*

In order to make artificial marble, it is necessary that the surface which is to be exposed, be colored so as to look like natural marble and at the same time, have the veins in it that are ordinarily found in natural marble.

The veining mixture consists of Keen's cement, silica, water as above set out mixed to a very thin consistency.

Thin strips of cloth or threads of twine are then dipped into the thin mixture and run across the surface of the bed of the mold.

The main body of the mixture is then poured into the mold.

Various colors of mixture can be used at the same time for giving to the marble, a blended effect so that it more nearly resembles true natural marble.

The entire mixture can be colored if desired, or the exposed surface only colored.

The veining material, which is nothing more than a thin mixture colored, can be dashed or sprayed in position so as to give a greater and more accurate blended effect to the finished product.

The thickness of the artificial marble or stone can be varied as desired.

It requires from about eight to twelve hours to permit the mass to dry so that it can be conveniently handled.

The surface of the material resting upon the glass or other smooth bed of the mold will be highly polished when removed.

I have found that the tensile strength of the material, when it becomes hard, is even better than natural marble and there is not the danger of cracking that there is in the natural marble.

The product that I make by my process, after it becomes hardened will not warp.

If a stone with a dull surface is desired, then the sugar is omitted from the solution and the mass or mixture is removed from the molds before it is completely "set and dry." The removing of the material before it is completely set will give a dull finish to the exposed surface.

It may be here mentioned that the entire mass, after poured into the mold should be given a vibratory movement in order to cause any air pockets within the mixture to come to the top.

The marble or tile slabs so formed can be used for wall finishing or floor finishing just like natural marble.

*Powder form.*

It may be here mentioned that the ingredients may be all mixed in powdered form and shipped in bags, and then mixed with water by the manufacturer of the artificial marble or rock.

It may also be mentioned that the powdered mixture can be placed upon a rough cement floor prepared for the purpose, and then troweled smoothly for giving to the floor a hard surface.

When the mixture is in dry form it consists of seventy pounds of Keene's cement, thirty pounds of silica or marble dust, ten pounds of potassium chlorate, and coloring matter of any suitable color depending upon the shade of color desired, twelve ounces of sugar in case a highly polished surface is desired.

The above mixture, when in powdered form, should be mixed with hot water until it reaches a paste-like consistency so that it can be poured and used. This may be used upon a wall, as ordinary plaster and there will give to the wall a hard finish.

The mixture, when it has set for sometime, can be then coated with sandarac dissolved in alcohol. I have found that twelve ounces of sandarac dissolved in one gallon of alcohol will give me a very fine coating that can be sprayed upon the surface of the marble or rock, and will make it retain a highly polished surface.

Some changes may be made in the steps of my process without departing from the essential part and purpose of my invention.

I claim as my invention:

1. The process of manufacturing artificial marble or the like comprising the mixing together of Keene's cement and silica in dry form, adding thereto potassium chlorate dissolved in hot water and while the solution so formed is still hot until a paste like consistency is had, pouring of the mixture upon a highly polished surfaced mold.

2. The process of manufacturing artificial marble or the like comprising the mixing together of Keene's cement and silica in dry form, adding thereto potassium chlorate and sugar dissolved in hot water and while the solution so formed is still hot until a paste like consistency is had, pouring of the mixture upon a highly polished surfaced mold.

3. The process of manufacturing artificial marble or the like comprising the mixing together of Keene's cement and silica in dry form, adding thereto potassium chlorate dissolved in hot water and while the solution so formed is still hot, until a paste like consistency is had, forming of veins by smearing a thin colored mixture over the molding surface of a highly polished mold and then pouring the mixture upon said smeared surface.

4. The process of manufacturing artificial marble or the like comprising the mixing together of Keene's cement and silica in dry form, adding thereto potassium chlorate dissolved in hot water while the solution so formed is still hot, until a paste like consistence is had, forming veins by smearing a thin colored mixture by use of a rag having the thin colored mixture therein and drawing it over the molding surface of a highly polished mold and then pouring the mixture upon said smeared surface.

5. The process of manufacturing artificial marble or the like comprising the mixing together of Keene's cement and silica in dry form, adding thereto potassium chlorate dissolved in hot water and while the solution so formed is still hot until a paste like consistency is had, forming of veins by use of a rag impregnated with a colored thin solution of the mixture itself and smearing it over a mold before the mixture is poured and then pouring the mixture thereover for giving a natural appearance to the resulting product.

6. The process of manufacturing artificial marble or the like comprising the mixing together of Keene's cement and silica in dry form, adding thereto potassium chlorate dissolved in hot water and while the solution so formed is still hot until a paste like consistency is had, forming of veins in the resulting product by use of a rag impregnated with a colored thin solution of the mixture itself and smearing it over a mold before the mixture is poured and then pouring the mixture thereover for giving a natural appearance to the resulting product and spraying the resulting product with sandarac dissolved in alcohol for giving it a highly polished surface.

Des Moines, Iowa, June 16, 1924.

OTTO KELL.